W. P. KEICHEL.
GUARD FOR LATHE DOGS.
APPLICATION FILED AUG. 9, 1916.

1,232,325.

Patented July 3, 1917.

Inventor
W. P. Keichel.

By Victor J. Evans
Attorney

Witnesses
H. Windridge
L. Wilcox

UNITED STATES PATENT OFFICE.

WILLIAM P. KEICHEL, OF SIEGFRIED, PENNSYLVANIA.

GUARD FOR LATHE-DOGS.

1,232,325. Specification of Letters Patent. Patented July 3, 1917.

Application filed August 9, 1916. Serial No. 114,018.

*To all whom it may concern:*

Be it known that I, WILLIAM P. KEICHEL, a citizen of the United States, residing at Siegfried, in the county of Northampton and State of Pennsylvania, have invented new and useful Improvements in Guards for Lathe-Dogs, of which the following is a specification.

This invention relates to guards adapted to be used in conjunction with machine lathe dogs and it consists in the novel features hereinafter described and claimed.

An object of the invention is to provide a guard of simple structure adapted to be applied to the face plate of a lathe and which may extend over the dog in a manner to prevent the same from coming in contact with the clothing of the machine operator or tools used during the turning operation and which also serves as means for preventing waste from becoming entangled with the dog and the securing devices thereof.

The guard is provided with a central opening of peculiar formation through which the fingers or a tool may be inserted for the purpose of releasing the dog from the work held upon the lathe or for applying the dog to the same. Also the said guard is provided in the vicinity of its edges with arcuate slots adapted to receive supporting bolts whereby it is held in place upon the face plate but which at the same time permits the guard to be adjusted by turning the same on the face plate in order to properly position the central opening in the guard with relation to the dog.

In the accompanying drawing:—

Figure 1:
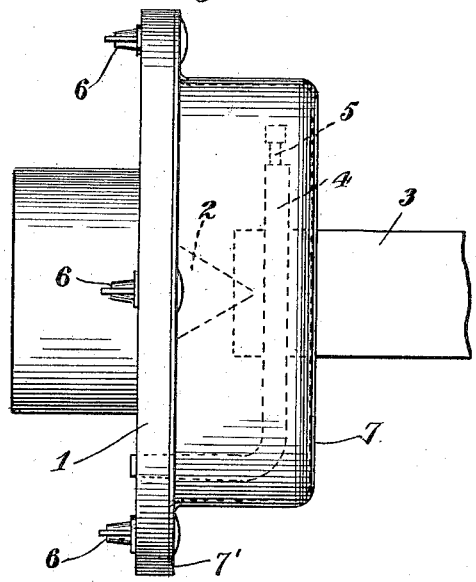
Figure 1 is an edge elevation of the face plate of a machine lathe showing the guard applied.
Figure 2:
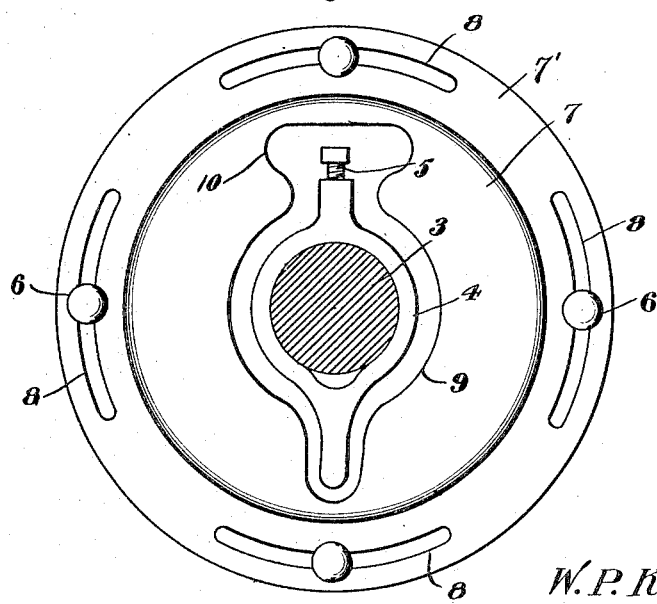
Fig. 2 is a plan view of the guard.

As illustrated in the accompanying drawing, the face plate 1 is of the usual form and carried upon a turning lathe. A center pin 2 is mounted in the face plate 1 in the usual manner and supports one end of the work which is indicated at 3. The dog 4 is of usual pattern and is applied to one end of the work 3 and secured in position thereon by means of a set screw 5. One end of the dog 4 engages the face plate in the usual manner whereby the work 3 is caused to rotate in unison with the said face plate. Bolts 6 pass transversely through the face plate and support a guard 7 on the said face plate. The guard 7 is in the form of a pan shaped body having at its edge a flat annular flange 7' provided with arcuate slots 8 which receive the bolts 6. When the bolts 6 are tightened the said guard is held at a fixed position upon the face plate 1. The intermediate portion of the guard 7 receives the dog 4 and the set screw 5 mounted thereon. The guard 7 is provided with a central opening 9 through which the dog 4 may be passed when the work 3 is positioned upon the centering pin 2. The opening 9 is provided at one end with an enlargement 10 through which the fingers or a tool may be inserted for the purpose of loosening or tightening the set screw 5 when the dog 4 is in position upon the work. After the dog 4 is secured in position upon the work the guard 7 may be turned and the arcuate slots 8 moved along the bolts 6. Thus the median longitudinal dimension of the opening 9 may be disposed transversely of the corresponding dimension of the dog 4 and the set screw 5 is housed behind a solid or closed portion of the guard 7. The bolts 6 are then tightened and hence the said guard will prevent waste from being blown into engagement with the set screw 5 and becoming entangled therewith.

From the foregoing description taken in conjunction with the accompanying drawing, it will be seen that when the guard is applied to the face plate that the dog is effectually protected and inclosed and the said dog and set screw carried thereby are prevented from coming in contact with the clothing of an operator or interfering with the handling of the tools about the lathe.

Having described the invention what is claimed is:—

In combination with a face plate of a lathe, a guard comprising a pan shaped body having an annular flange provided with arcuate slots located in the vicinity of its edge and disposed concentrically of the body, bolts passing through the slots and through the face plate and serving as means for securing the guard to the face plate, said guard having a central opening through which a dog may pass, the said opening being provided at one end with enlargements through which a tool may be inserted for manipulating the set screw of the dog.

In testimony whereof I affix my signature.

WILLIAM P. KEICHEL.

Copies of this patent may be obtained for five cents each, by addressing the "Commissioner of Patents, Washington, D. C."